United States Patent
Simonis et al.

(10) Patent No.: US 11,912,159 B2
(45) Date of Patent: Feb. 27, 2024

(54) METHOD AND DEVICE DETERMINING THE STATE OF CHARGE OF A BATTERY IN AN ELECTRICALLY DRIVABLE MOTOR VEHICLE

(71) Applicant: Robert Bosch GmbH, Stuttgart (DE)

(72) Inventors: Christian Simonis, Leonberg (DE); Christoph Woll, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 258 days.

(21) Appl. No.: 17/482,553

(22) Filed: Sep. 23, 2021

(65) Prior Publication Data

US 2022/0089059 A1    Mar. 24, 2022

(30) Foreign Application Priority Data

Sep. 24, 2020   (DE) ............ 10 2020 211 988.0

(51) Int. Cl.
*B60L 58/12* (2019.01)
*B60L 53/62* (2019.01)

(52) U.S. Cl.
CPC .............. *B60L 58/12* (2019.02); *B60L 53/62* (2019.02)

(58) Field of Classification Search
CPC ...... B60L 58/12; B60L 53/62; B60L 2240/54; B60L 2240/545; B60L 2240/547; B60L 2240/549; B60L 2260/44; B60L 58/16; B60L 58/10; Y02T 10/70; Y02T 10/7072; Y02T 90/12; G01R 31/3842; G01R 31/392; G01R 31/396
USPC ...................................................... 320/104
See application file for complete search history.

(56) References Cited

U.S. PATENT DOCUMENTS

2018/0095141 A1*   4/2018   Wild .................. B60L 58/12

FOREIGN PATENT DOCUMENTS

DE    10 2016 210 341 A1    12/2016

OTHER PUBLICATIONS

Lebel, F-A., "A Lithium-Ion Battery Electro-Thermal Model of Parallellized Cells," IEEE 84th Vehicular Technology Conference, 2016 (6 pages).

(Continued)

*Primary Examiner* — Paul Dinh
(74) *Attorney, Agent, or Firm* — Maginot, Moore & Beck LLP

(57) ABSTRACT

A method for operating a system for ascertaining a state of charge of a battery of a motor vehicle includes providing operating variables of the battery, providing a calculated state of charge in the motor vehicle using a state-of-charge model that indicates a calculated state of charge depending on at least one battery model parameter of the state-of-charge model for the battery, and ascertaining a reference state of charge using a reference state-of-charge model depending on the operating variables. The reference state-of-charge model is trained to indicate the reference state of charge depending on the operating variables and/or a predefined aging state. The method further includes performing a correction of the at least one battery model parameter depending on a difference between the reference state of charge and the calculated state of charge in order to adapt the calculated state of charge to the reference state of charge.

15 Claims, 6 Drawing Sheets

(56) References Cited

OTHER PUBLICATIONS

Chen, X. et al., "A novel approach to reconstruct open circuit voltage for state of charge estimation of lithium ion batteries in electric vehicles," Applied Energy, Aug. 2019, vol. 255 (14 pages).
Naitmalek, Y. et al., "One the Use of Machine Learning for State-of-Charge Forecasting in Electric Vehicles," 5th IEEE International Smart Cities Conference, 2019, pp. 408-413 (6 pages).

* cited by examiner

METHOD AND DEVICE DETERMINING THE STATE OF CHARGE OF A BATTERY IN AN ELECTRICALLY DRIVABLE MOTOR VEHICLE

This application claims priority under 35 U.S.C. § 119 to patent application no. DE 10 2020 211 988.0, filed on Sep. 24, 2020 in Germany, the disclosure of which is incorporated herein by reference in its entirety.

The disclosure relates to battery-operated machines, in particular motor vehicles, such as electric vehicles or hybrid vehicles, and further to measures for determining a state of charge of a battery.

BACKGROUND

The energy supply of electrically operable battery-operated machines, such as electrically drivable motor vehicles, is made using a battery as an electrical energy store. When operating an electrically drivable motor vehicle, an indication of the current state of charge of the battery is essential. On the one hand, the driver or a navigation system requires the indication of the current state of charge in order to plan a possible stop in order, if necessary, to carry out a charging process. On the other hand the state of charge is necessary for the energy management system, in particular for carrying out a hybrid strategy in a hybrid drive system.

In addition to the functions for operating the battery, a state-of-charge model is also stored in today's battery controllers, making it possible to determine the current state of charge from a current battery current, a current battery voltage, a current battery temperature, an aging state and the like. The state-of-charge model is, moreover, parameterized with a large number of parameters which can potentially also take a historical loading of the battery into consideration.

As important battery model parameters, the state-of-charge model includes an open-circuit voltage, an internal resistance and the component values of one or a plurality of RC networks, namely in each case a parallel resistor with a capacitor capacitance connected in parallel with it. The battery model parameters depend on the aging state of the battery. The consideration of the aging of the battery in the corresponding state-of-charge model is at present only inadequately implemented in battery controllers, in part because at present the aging state can only be indicated with insufficient accuracy inside the vehicle.

SUMMARY

A method for ascertaining a state of charge of a battery of a battery-operated machine according to the disclosure is provided as are a method for operating a central unit for providing a reference state of charge, a method for operating a battery-operated machine and corresponding devices.

According to a first aspect, a method for ascertaining a state of charge of a battery of a machine using a state-of-charge model is provided; it has the following steps:
  providing operating variables of a battery;
  providing a state of charge calculated in the machine using a state-of-charge model that indicates a calculated state of charge depending on at least one battery model parameter of the state-of-charge model for the battery;
  ascertaining a reference state of charge using a reference state-of-charge model depending on the operating variables, wherein the reference state-of-charge model is trained to indicate the reference state of charge depending on the operating variables and, in particular, depending on a predefined aging state;
  performing a correction of the at least one battery model parameter depending on a difference between a reference state of charge and the calculated state of charge in order to adapt the calculated state of charge to the reference state of charge.

A knowledge of the current state of charge of the battery is essential for the operation of a battery-operated machine with a battery. The state of charge changes during the active operation continuously as a result of charge withdrawal, wherein the type of operating mode and the current battery state determine, in a non-linear manner, how the state of charge of the battery is reduced with a specific charge withdrawal or is increased with charge addition during a charging process or during a recovery process (braking energy recovery).

Ascertaining the current state of charge is usually done using a state-of-charge model that indicates a current state of charge of the battery on the basis of operating variables of the battery such as, for example, a current battery current, a current battery temperature and a current battery voltage (terminal voltage). The state of charge here is usually indicated as a proportion, in percent, of the maximum charge capacity with a fully charged battery. The battery model parameters with the aid of which the state of charge is determined include, in particular, an open-circuit voltage of an individual cell of the battery, an internal resistance value as well as a parallel resistance value and a capacitor capacitance of one or a plurality of RC networks. The battery model parameters depend in turn on an aging state of the battery.

The purpose of the state-of-charge model is to ascertain a current state of charge of the battery on the basis of current operating variables, the current aging state, and battery model parameters. The state-of-charge model is prepared and implemented on the basis of measurements.

The aging state of the battery can be estimated from operating variables of the battery on the basis of a predefined aging state model.

Completing the data set of the state-of-charge model depending on the battery model parameters that depend on the aging state, and the current operating variables that indicate the current operating state, is very laborious, in particular since the ascertainment of the aging state requires an aging state model whose data set is also very laborious to complete. Implementation in a battery controller in a machine is thus very resource-intensive.

In addition, state-of-charge models of this sort can only be implemented in a battery controller of a machine with considerable effort, since the temperature and the dependency on the aging state can only be fully and comprehensively modelled with great effort due to the highly dynamic load transitions and recuperation processes, as well as the relaxation behavior.

The state-of-charge model corresponds to a physically-based battery model in order to assign a current state of charge from operating variables such as the current terminal voltage, the current battery current, the current battery temperature and the aging state of the battery.

The above method provides for correcting the state-of-charge model in a battery-operated machine using an additionally provided reference state-of-charge model. For this purpose, the current state of charge calculated in the machine is compared with a current state of charge ascertained using the reference state-of-charge model, in order to correct the state-of-charge model of the machine in an appropriate manner. The reference state-of-charge model, in particular in the form of a multidimensional characteristic map, maps the aging state, the battery temperature, the battery voltage and the battery current onto a reference state of charge. The reference state-of-charge model is particularly accurate, since this can be prepared using a larger database, in particular on the basis of fleet data from a large number of battery-operated machines.

If a deviation is found between the state of charge modelled in the machine and the ascertained reference state of charge, then a correction of the state-of-charge model is required.

The reference model is preferably implemented outside the machine in a central unit, so that the reference state-of-charge model can be provided, trained and improved on the basis of fleet data of a large number of machines. The correction can take place on the basis of a difference between a state of charge ascertained at a partially stationary operating point and the reference state of charge. The state-of-charge model is based on a physical model of an equivalent battery circuit in which the battery model parameters of the open-circuit voltage, a series resistor and the components of one or a plurality of RC networks are taken into consideration.

A correction of the state-of-charge model based on that can be carried out on the basis of a difference between a state of charge modelled with the state-of-charge model and a reference state of charge modelled with the reference state-of-charge model. The correction is preferably done in such a way that only the series resistor is adapted, and the remaining model parameters are furthermore adapted in such a way that a continuous curve, differentiable in time, of the modelled state of charge results.

The at least one battery model parameter can comprise a series resistor of an equivalent battery circuit of the battery, wherein, in particular, only the series resistor is corrected.

It can be provided that the correction is carried out in that multiple differences between the reference state of charge and the calculated state of charge are ascertained, wherein the reference state-of-charge model is implemented externally in a central unit, and the operating variables of the battery are transmitted from a machine concerned to the central unit.

The reference state of charge can be transmitted to the machine, or a trigger signal is ascertained that depends on a result of the comparison between the reference state of charge and a calculated state of charge.

According to one embodiment, the correction can be carried out on the basis of a calculated state of charge that is ascertained with operating variables during a static operation of the battery, wherein the static operation corresponds to an operation of the battery at a constant battery current during a predefined minimum period of time.

It can be provided that the aging state is ascertained using an aging state model in a central unit and an aging state is provided depending on curves of operating variables and is taken into consideration in the reference state-of-charge model for ascertaining the reference state of charge.

The correction can furthermore be carried out in that a characteristic curve that represents the series resistor depending on the state of charge is corrected depending on the difference between the state of charge and the reference state of charge.

The precision of the reference state-of-charge model can be successively improved in that the corrections of the at least one battery model parameter are transmitted to the central unit and recorded, wherein systematic deviations of the reference state-of-charge model are corrected on the basis of the corrections of a large number of machines.

According to a further aspect, a method is provided for operating a central unit for providing a reference state of charge for a battery of a battery-operated machine, in particular for the above method, with the following steps:
receiving operating variables of a battery;
ascertaining a reference state of charge of the battery with a predefined reference state-of-charge model on the basis of the operating variables of the battery;
transmitting the reference state of charge to the machine or transmitting a trigger signal that is ascertained depending on a result of the comparison between the reference state of charge and a calculated state of charge received from the motor vehicle to the machine.

According to a further aspect, a method for operating a battery-operated machine for ascertaining a calculated state of charge of a battery in the machine is provided, with the following steps:
ascertaining a calculated state of charge using a state-of-charge model depending on operating variables of the battery, wherein the operating variables are ascertained during a static operation of the battery, wherein the static operation corresponds to an operation of the battery at a constant battery current during a predefined minimum period of time;
correcting at least one battery model parameter of the state-of-charge model depending on a difference between a received reference state of charge and the calculated state of charge;
ascertaining a calculated state of charge depending on the corrected state-of-charge model.

According to a further aspect, a system for ascertaining a state of charge of a battery of a machine is provided, wherein the system comprises a plurality of machines and a central unit, wherein the system is designed to:
provide operating variables of a battery;
providing a state of charge calculated in the machine using a state-of-charge model that indicates a calculated state of charge depending on at least one battery model parameter of the state-of-charge model for the battery;
ascertain a reference state of charge using a reference state-of-charge model in the central unit depending on the operating variables, wherein the reference state-of-charge model is trained to indicate the reference state of charge depending on the operating variables and, in particular, depending on a predefined aging state;
perform a correction of the at least one battery model parameter depending on a difference between the reference state of charge and the calculated state of charge in order to adapt the calculated state of charge to the reference state of charge.

According to a further aspect, a device, in particular a data processing unit in a central unit, for providing a reference state of charge for a battery of a battery-operated machine is provided, wherein the device is designed to
receive operating variables of a battery;
ascertain a reference state of charge of the battery with a reference state-of-charge model on the basis of the operating variables of the battery;
transmit the reference state of charge to the motor vehicle or transmit a trigger signal that is ascertained depending on a result of the comparison between the reference state of charge and a calculated state of charge received from the motor vehicle to the motor vehicle.

According to a further aspect, a device, in particular a control unit in a motor vehicle, for ascertaining a calculated state of charge of a battery in the motor vehicle is, wherein the device is designed to:

- ascertain a calculated state of charge using a state-of-charge model depending on operating variables of the battery, wherein the operating variables are ascertained during a static operation of the battery, wherein the static operation corresponds to an operation of the battery at a constant battery current during a predefined minimum period of time;
- correct at least one battery model parameter of the state-of-charge model depending on a difference between a received reference state of charge and the calculated state of charge;
- ascertain a calculated state of charge depending on the corrected state-of-charge model.

BRIEF DESCRIPTION OF THE DRAWINGS

Embodiments are explained below in more detail with reference to the appended drawings, in which.

DETAILED DESCRIPTION

The method is described below with reference to vehicle batteries as batteries in a plurality of motor vehicles as battery-operated machines. A state-of-charge model for the respective battery can be implemented in a control unit in the motor vehicles. With the aid of a central unit, the state-of-charge model can be continuously updated or re-parameterized on the basis of operating variables of the vehicle batteries from the vehicle fleet.

The above example is representative of a large number of stationary or mobile machines with grid-independent energy supply, such as, for example, vehicles (electric vehicles, pedelecs etc.), plant, machine tools, household appliances, IOT devices and the like that are connected to a central unit (cloud) via a corresponding communication link (e.g. LAN, Internet).

Figure 1:
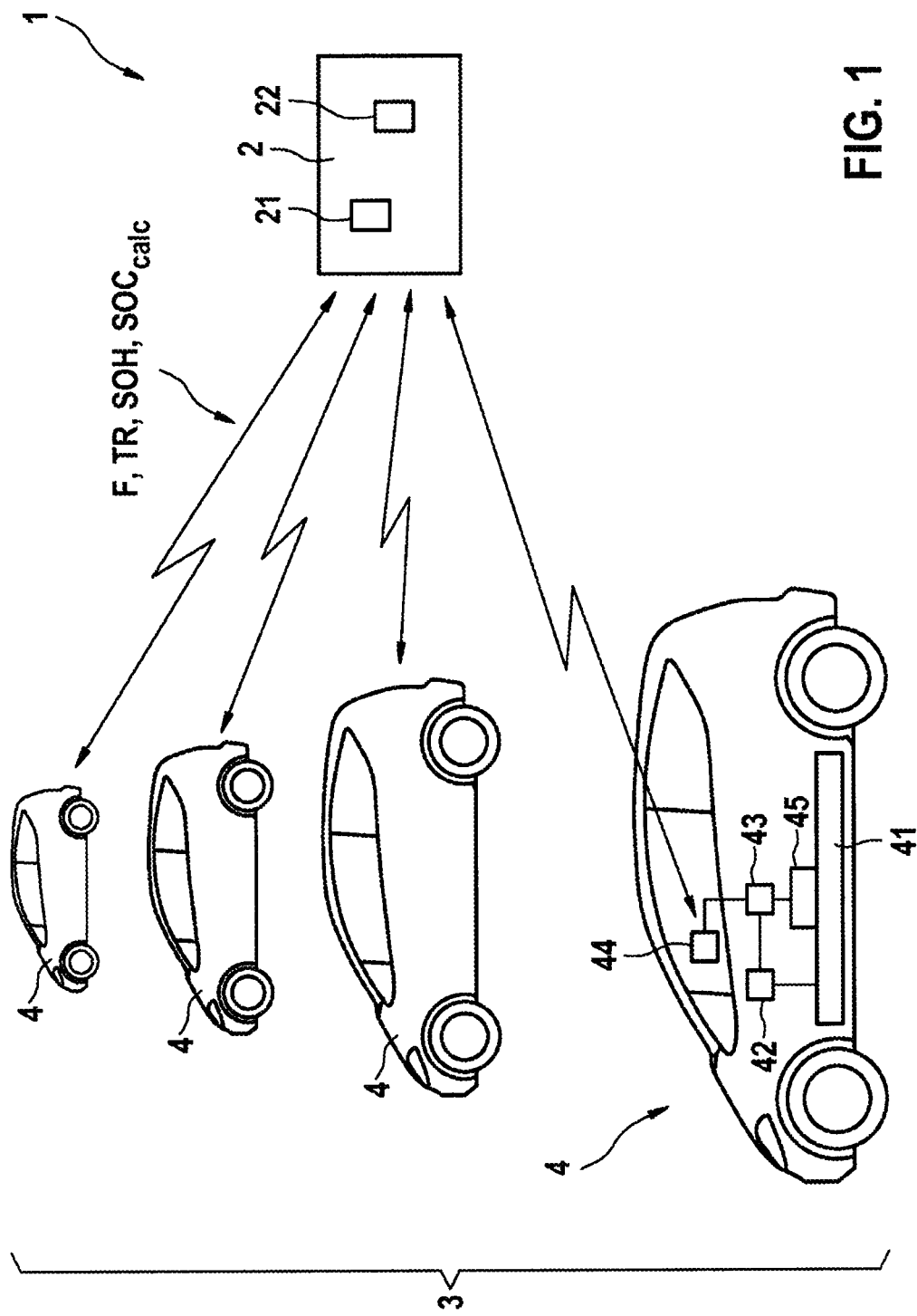
FIG. 1 shows a schematic illustration of a system for providing a state of charge in a motor vehicle using a central unit based on fleet data of a vehicle fleet.

FIG. 1 shows a system 1 with a central unit 2 that is connected in combination with a large number of motor vehicles 4 of a vehicle fleet 3. One of the motor vehicles 4 is illustrated in more detail as a representative for the other motor vehicles in FIG. 1.

The motor vehicles 4 each comprise a battery 41 as a rechargeable, electrical energy store, an electric drive motor 42 and a control unit 43 which together form a drive system as is known from the prior art.

The control unit 43 is connected to a communication module 44 that is suitable for transmitting data between the respective motor vehicle 4 and the central unit 2 (known as a cloud). Operating variables of the battery are acquired using a sensor system 45 in a manner known per se.

The central unit 2 comprises a data processing unit 21 in which the method explained below can be carried out, and a database 22 for storing aging state profiles of batteries 41 of a large number of vehicles 4 of the vehicle fleet 3.

The operating variables indicate at least variables on which the aging state of the battery depends. The operating variables F can indicate a profile of the battery current, a profile of the battery voltage (terminal voltage), a profile of the battery temperature and a profile of the state of charge. The operating variables F also always comprise the current values of the battery current, the battery voltage and the battery temperature. The operating variables F are acquired at a fast time raster of between 2 and 100 Hz, and can be transmitted to the central unit regularly in uncompressed and/or compressed form. The temporal series can, for example, be transmitted in blocks to the central unit 2 at intervals of from 10 minutes up to several hours.

In the central unit 2, or, in other embodiments, also already in the respective motor vehicles 4, operating features that relate to an evaluation time period can be generated from the operating variables F. The operating features are used for the determination of an aging state. These are, in each case, ascertained for sequential evaluation time periods of a few hours (six hours, for example) up to several weeks (one month, for example). One week is a usual value for the evaluation time period.

The operating features can, for example, comprise features related to the evaluation time period and/or accumulated features and/or static variables ascertained over the whole of the service life so far. The operating features can, for example, in particular comprise: histogram data relating to the state of charge profile, the temperature, the battery voltage, the battery current, in particular histogram data relating to the battery temperature distribution in relation to the state of charge, the charging current distribution in relation to the temperature and/or the discharge current distribution in relation to the temperature, the accumulated total charge (Ah), an average capacity increase during a charging process (in particular for charging processes in which the increase in charge lies above a threshold proportion (e.g. 20%) of the total battery capacity), a maximum of the differential capacity (dQ/dU: charge change divided by the change in the battery voltage) and others.

An aging state model can be provided in the central unit 2, prepared on the basis of characteristic curves, on a physical basis or on the basis of data. The aging state model can evaluate operating feature points, and these can ascertain an aging state of the respective battery of a particular vehicle of the vehicle fleet.

Figure 2:
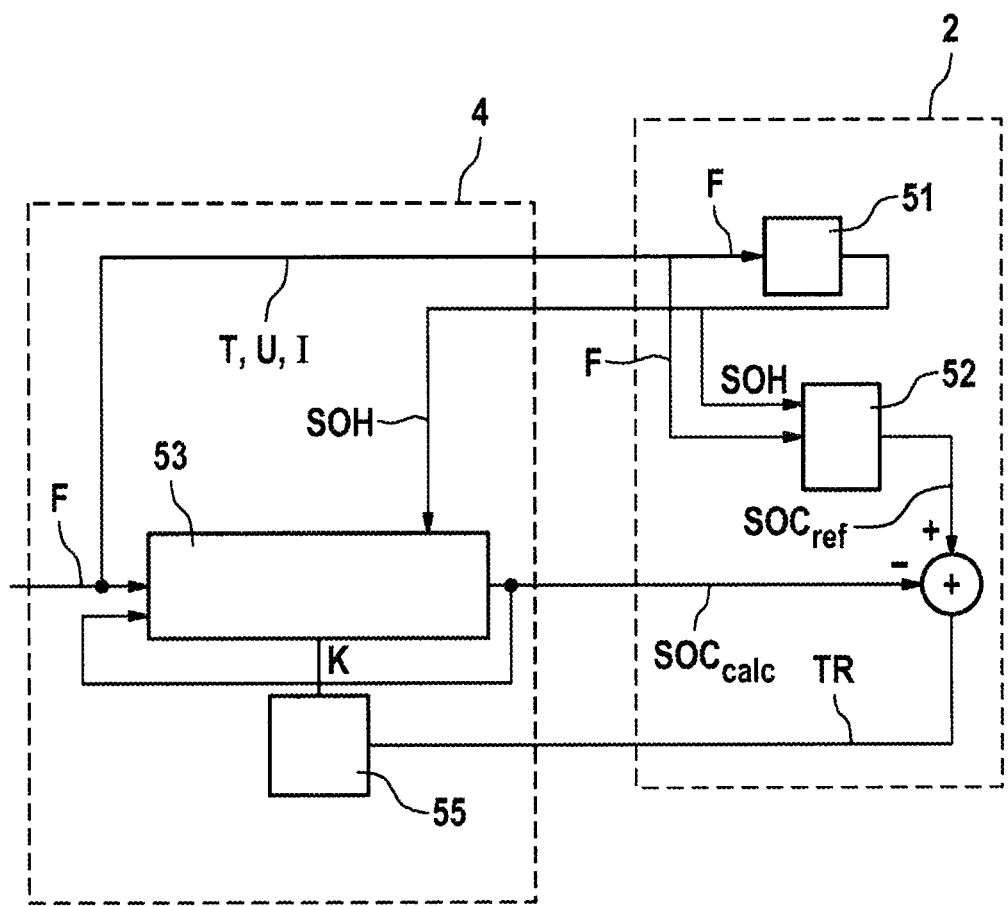
FIG. 2 shows a schematic function-block illustration of a procedure for ascertaining a state of charge of a battery using a state-of-charge model and a correction function.
Figure 3:
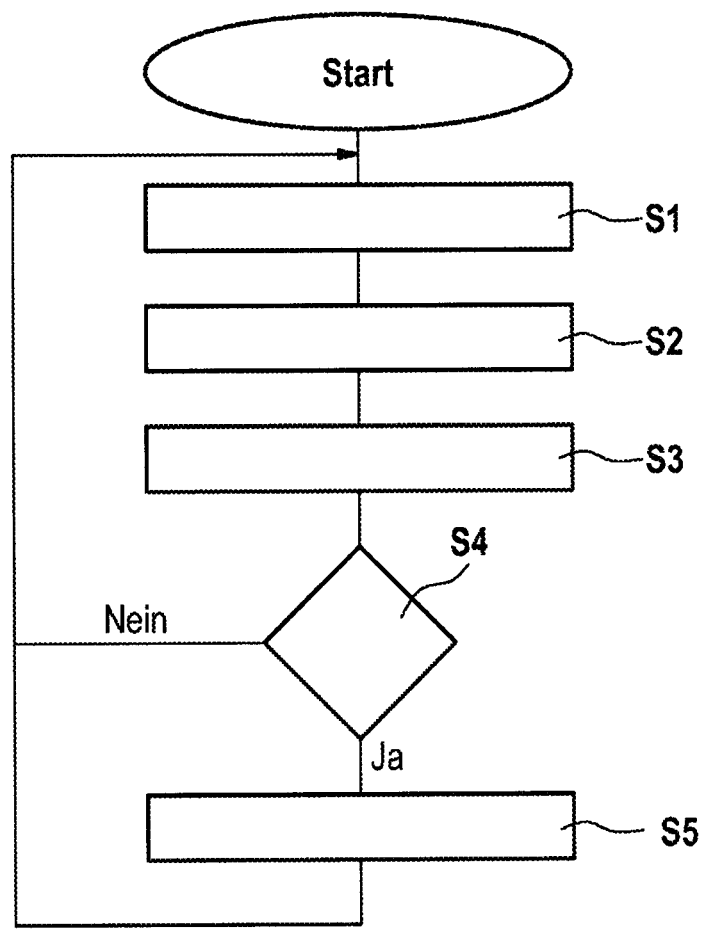
FIG. 3 shows a flow diagram to illustrate a method carried out in a central unit for correcting a state-of-charge model for ascertaining a state of charge of a battery.
Figure 4:
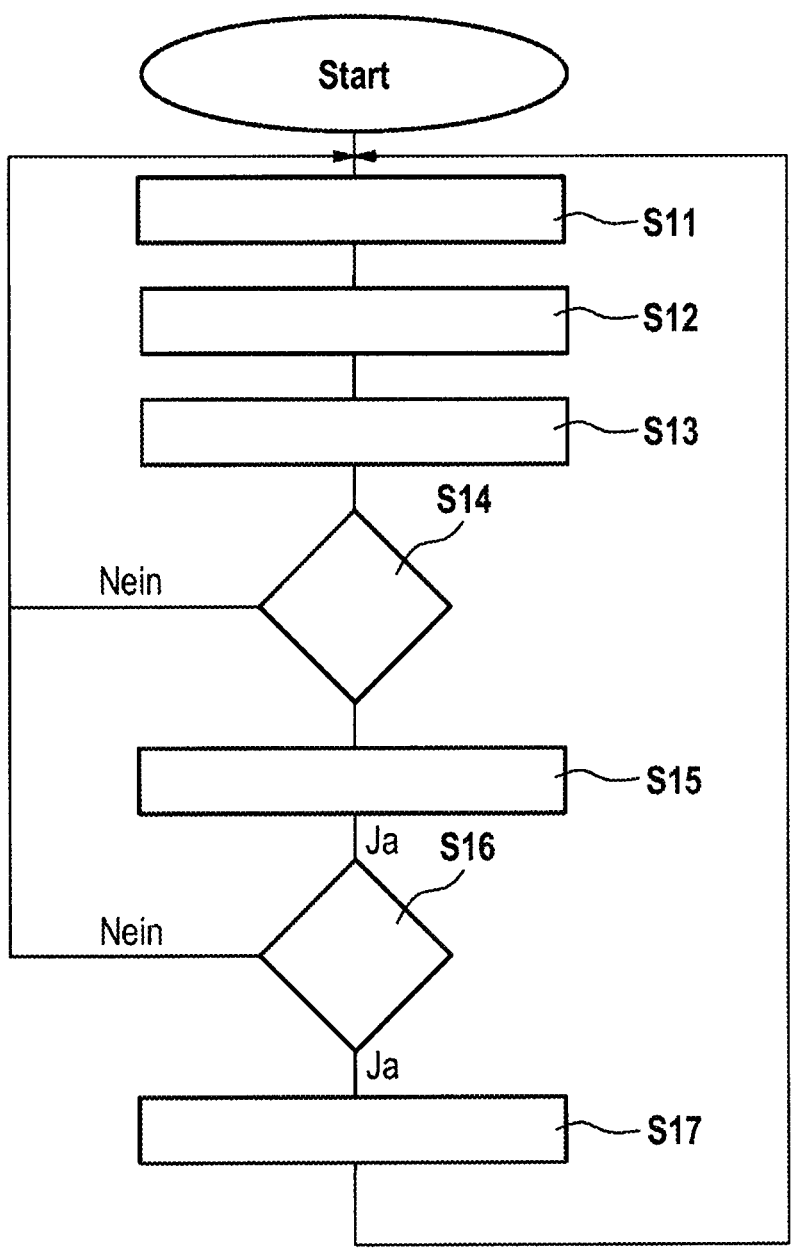
FIG. 4 shows a flow diagram to illustrate a method performed in a motor vehicle for carrying out a correction of the state-of-charge model for a battery in a motor vehicle with a correction characteristic curve.

A block diagram to illustrate the function that is carried out in the system 1 with the central unit 2 and the respective vehicle 4 of the vehicle fleet 3 is illustrated in more detail in FIG. 2. FIG. 3 accordingly shows a flow diagram to illustrate a method that is carried out in the central unit 2 of the system 1, in particular in the data processing unit 21. FIG. 4 shows the part of the method that is carried out in the motor vehicle, in particular in the control unit 43. The method for ascertaining a state of charge is described by way of example in more detail below for one motor vehicle 4 of the vehicle fleet 3.

In step S1 the operating variables F of the battery 41, as described above, are transmitted to the central unit 2 and received there. A current state of charge $SOC_{calc}$ calculated in the respective motor vehicle 4 is furthermore transmitted.

The operating variables F are grouped in step S2 to form operating features. Operating variables F and/or operating features are subsequently processed in the physically-based or data-based aging state model 51 in the central unit 2, in order to obtain the current aging state SOH.

The aging state (SOH: state of health) is a key variable for indicating a remaining maximum battery capacity or remaining maximum battery charge. This is used to ascertain the state of charge, which is usually indicated as a percentage proportion of the maximum battery charge. The aging state can be stated as a capacity retention rate (SOH-C) or as a rise in the internal resistance (SOH-R). The capacity retention rate SOH-C is given as the ratio between the measured capacity at the time to an initial capacity of the fully charged battery. The relative change in the internal resistance SOH-R rises as the battery becomes older. The aging state can accordingly be made available as the SOH-C or as the SOH-R.

The aging state SOH of the battery 41 modelled in this way, and the operating variables F received from the specific motor vehicle 4 are supplied in step S3 to a reference state-of-charge model 52 that outputs a reference state of charge $SOC_{ref}$. The reference state-of-charge model 52 is particularly carried out outside the vehicle in the central unit 2, and can be prepared on the basis of fleet data and, in relevant cases, continuously improved on the basis of fleet data.

The aging state SOH modelled in this way can furthermore be transmitted to the motor vehicle 4, where it replaces an aging state that can be ascertained with a less accurate aging state model.

The reference state-of-charge model 52 makes it possible to map the current battery current, the current battery temperature, the current terminal voltage and the aging state SOH ascertained in step S2 onto a reference state of charge $SOC_{ref}$.

The reference state-of-charge model 52 is, for example, represented in the form of a lookup table or of a characteristic map, and is, for example, ascertained from measurements carried out in the laboratory and from on-line calculations for the battery under controlled conditions. The energy actually stored in the battery or extracted from it can here, in particular, be determined exactly and assigned to a reference state of charge. An aging state determination can in particular be carried out after each complete discharge of the battery, in order to train the state-of-charge model as accurately as possible. Data can be added to the reference state-of-charge model by varying the battery currents and the battery temperature.

The aging state model 51 and the reference state-of-charge model 52 are preferably implemented in the central unit 2. This has the advantage that these can be updated regularly or continuously, in particular on the basis of fleet data.

A check is made in step S4 as to whether a deviation, in particular of more than a predefined threshold value, has occurred between the reference state of charge $SOC_{ref}$ and the calculated state of charge $SOC_{calc}$ that has been transmitted by the motor vehicle 4 concerned. If a deviation is established between the reference state of charge $SOC_{ref}$ and the calculated state of charge $SOC_{calc}$ (alternative: Yes), then a correction is initiated in the motor vehicle in step S5, otherwise (alternative: No) a return is made to step S1.

The method for carrying out a correction to the ascertainment of the state of charge in the motor vehicle 4 is described below.

A state-of-charge model 53 is maintained in the motor vehicle 4 continuously for this purpose in step S11, in order to provide the current, calculated state of charge $SOC_{calc}$ in the motor vehicle 4 for subsequent vehicle functions. In the same way, the current operating variables F and the current, calculated state of charge $SOC_{calc}$ are transmitted to the central unit 2.

The state-of-charge model comprises a battery model and an assignment model. The purpose of the battery model is, on the basis of battery model parameters that correspond to parameters of components of an equivalent battery circuit, to model a modelled open-circuit voltage depending on a current battery voltage U of the battery 41 (terminal voltage), a current battery current I, a current battery temperature T and depending on an aging state SOH.

The assignment model is, as a rule, implemented as a predefined characteristic map, and its purpose is to assign a current, calculated state of charge $SOC_{calc}$ to the modelled open-circuit voltage, depending on an aging state SOH of the battery 41 and on the current battery temperature T.

In the ascertainment of the modelled open-circuit voltage, the battery model parameters are determined depending on the current (ascertained most recently) state of charge $SOC_{calc}$ and the aging state SOH in accordance with predetermined characteristic maps.

The state-of-charge model 53 implemented in the vehicle 4 uses the operating variables F, in particular the current battery voltage U, the current battery current I, the current aging state SOH, and ascertains a current state of charge $SOC_{calc}$ in step S12. The current aging state SOH can be ascertained inside the vehicle using an appropriate aging state model 53 implemented in the vehicle, or can be received from the central unit 2. The aging state model 53 in the central unit 2 can perform a more precise ascertainment of the aging state SOH of the battery 41 on the basis of fleet data. The ascertainment of the current state of charge $SOC_{calc}$ using the state-of-charge model 53 corresponds, as a rule, to a standard model, and is associated with a relatively high inaccuracy. The calculated current state of charge $SOC_{calc}$ is consequently inaccurate.

The modelled state of charge $SOC_{calc}$ is supplied in step S13 to a further vehicle function 56. The further vehicle function can comprise a navigation function, for example to plan a possible stop in order, if relevant, to carry out a charging process, an energy management function, in particular for executing a hybrid strategy in a hybrid drive system, or a simple display function for informing the driver of the current state of charge SOC or of a remaining range that can be determined from that.

Whether a partially stationary state of the battery 41 is present is checked in step S14. This can be recognized by monitoring the profile of the battery current. If the battery current is constant for a predetermined period of time, or if it varies within a predetermined tolerance range, e.g. ±5%, as can, for example, be the case during longer car journeys or cross-country journeys, and if the predetermined period of time exceeds an applied, predetermined minimum time period of, for example, 30 seconds (alternative: Yes) the procedure is continued with step S15, otherwise (alternative:

No) the flow returns to step S11. The predetermined minimum time period ensures that a relaxed battery voltage is measured as the battery voltage, with which the current state of charge can be ascertained more reliably.

Figure 5:
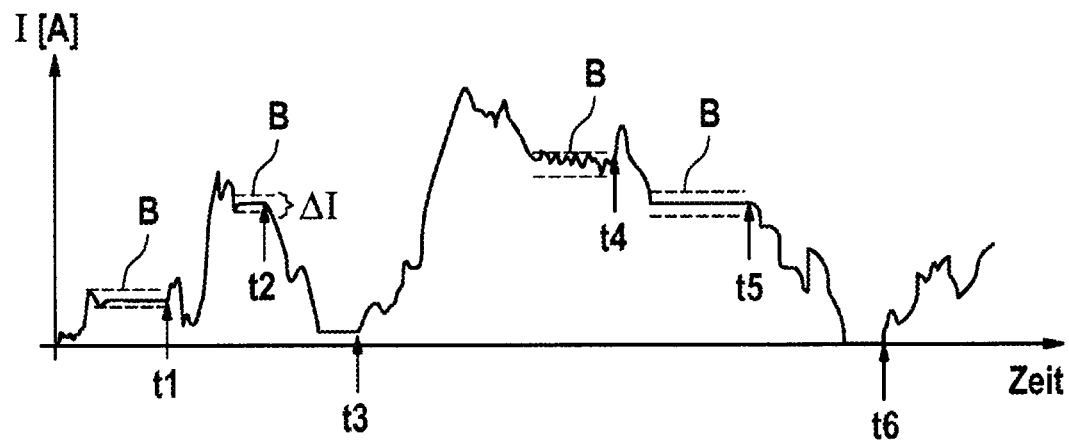
FIG. 5 shows an exemplary temporal profile of a battery current to illustrate a period of time in which a current battery voltage of the battery can be acquired for ascertaining the state of charge.

A curve of the battery current over a plurality of charge and discharge phases is illustrated by way of example in FIG. 5. The suitable time points t1, t2, t3, t4, t5 and t6 for correction of the state-of-charge model emerge when the curve of the battery current leaves a tolerance range B about a constant current magnitude above or below, and the duration during which the battery current is within this tolerance range B is greater than the predetermined minimum time duration, since a transient behavior can be assumed in these cases.

Even during a CC (constant current) charging phase of the battery 41, the voltage can be continuously measured, since the range of variations is very low there because the charging is done using a regulated, constant current. A large number of measuring points for correction of the state of charge thereby emerge according to this method.

Thus a correction can be made every time that the partially stationary operation with a nearly constant current curve for a predetermined minimum period of time is left. Towards the end of a CV phase—charging with a constant charging voltage in order to completely charge the battery—the charging current again only varies very little, and lies within a narrow tolerance range so that here again the current modelled state of charge $SOC_{calc}$ can be matched with the reference state of charge $SOC_{ref}$ of the reference state-of-charge model 52.

The modelled state of charge $SOC_{calc}$ is transmitted in step S15 to the central unit 2. As described previously in connection with FIG. 3, a check is thus made there as to whether a correction of the state-of-charge model 53 is necessary.

A check is made in step S16 as to whether a trigger signal for correction of the state-of-charge model has been received. If this is the case (alternative: Yes), the method is continued in step S17, otherwise (alternative: No) a return is made to step S11.

The state-of-charge model 53 is corrected using a correction block 55 in step S17. A correction of the battery model is carried out in the correction block 55.

As a rule, the state-of-charge model uses an equivalent battery circuit, and the operating variables of the current battery voltage (terminal voltage), the current battery current and a current battery temperature in order to determine a modelled open-circuit voltage $U_{ocv}$. The equivalent battery circuit comprises, as battery model parameters, a series resistor R0 along with a further resistor and a capacitor of one or a plurality of RC networks R1, C1, R2, C2 . . . , wherein the battery model parameters of the battery temperature T depends on the current state of charge $SOC_{calc}$ and, in particular, on the aging state SOH of the battery. Highly dynamic load transitions can in particular be taken more precisely into consideration through battery model parameters R2, C2, . . . of multiple RC networks.

As a result, inaccuracies in the determination of the modelled state of charge $SOC_{calc}$ in the vehicle in the range of a few percent result. This inaccuracy is taken into consideration in a range determination, which results in a reduced estimated range. The charging duration can also be lengthened by the inaccuracy of the state-of-charge model 53, in order to achieve a specified minimum state of charge.

These battery model parameters are to be adapted in such a way that a modelled open-circuit voltage is ascertained from the measured battery voltage, the constant battery current and the battery temperature. This takes place in accordance with the time points at which a correction is initiated. The precise battery model parameters are relevant for the calculation of the state of charge, but also for the calculation of limits for the final discharging voltage and final charging voltage, limits for the deep discharging and the like.

The impedance of the battery according to the equivalent battery circuit, i.e. the series interconnection of the series resistor R0 and one or a plurality of RC networks with the resistors R1 and C1, is found as follows:

$$Z = \sqrt{R0^2 + \left(\frac{R1}{\sqrt{(1+(\omega R1 C))^2}}\right)^2}$$

If the current loading is constant, the formula simplifies to:

$$Z = \sqrt{R0^2 + R1^2}$$

In addition to the open-circuit voltage $U_{ocv}$, the battery voltage U is largely determined by the two resistance values R0, R1 and the battery current I. Since the effect of the series resistor R0 is dominant during stationary current loading, and the resistor of the RC network has a greater effect on the dynamic behavior, a system of equations with an excessively large number of dimensions is not needed in order to determine the value of R0. It is thus primarily the series resistor R0 that is corrected for the purpose of correction.

The adaptation of the series resistor R0 is made through a punctual correction in the form of an offset with a correction magnitude K for the corresponding current aging state $SOC_{calc}$. The characteristic map that represents the series resistor against the calculated state of charge $SOC_{calc}$ is, furthermore, changed in such a way that the further profile of the series resistor R0 is adapted to the correction. Since a step change cannot occur in reality, the characteristic curve that represents the series resistor R0 against the state of charge is fitted to a new resistance curve by means of a support value with a fixed specification (at SOC=100%) and the series resistor R0 corrected with the current state of charge $SOC_{calc}$ ascertained at the correction time point $t_{Korr}$ so that a corrected profile of the series resistor R0 against the state of charge $SOC_{calc}$ results. As a result of the fitting, this curve remains monotonic, and no jumps therefore occur in the calculation of the state of charge $SOC_{calc}$.

Figure 6:
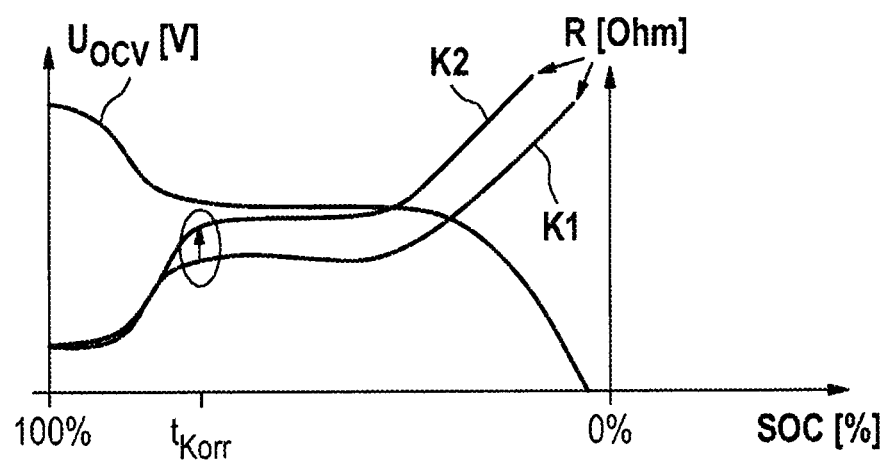
FIG. 6 shows curves of the series resistor of the battery model depending on the state of charge before and after the correction and FIGS. 7a and 7b show histograms of correction manipulations collected in the central unit before and after the improvement of the reference state-of-charge model.

This is shown, for example, with reference to the diagram in FIG. 6. The diagram shows the profiles K1, K2 of the series resistor R0 against the state of charge before and after the correction. The shift in the curve of the series resistor R0 can be seen, so that the value remains unchanged at a state of charge of 100%. The shift in R0 is selected such that the state-of-charge profiles The reference state-of-charge model 52 can also be successively made more precise in the context of the method described above. All of the correction manipulations for the correction of the state-of-charge calculation in the motor vehicle 4 for all of the vehicles of the vehicle fleet 3 are accordingly transmitted to the central unit 2 for this purpose, where they are recorded. On the basis of the stored correction manipulations, a histogram, for example, of the level of the correction manipulations in accordance with their frequencies can be prepared, as is, for example, shown in FIG. 7a. The histogram indicates frequencies (in numbers) of cases in which a correction lies within a predefined residue region. The region of possible residues is divided for this purpose into residue regions.

Figure 7B:
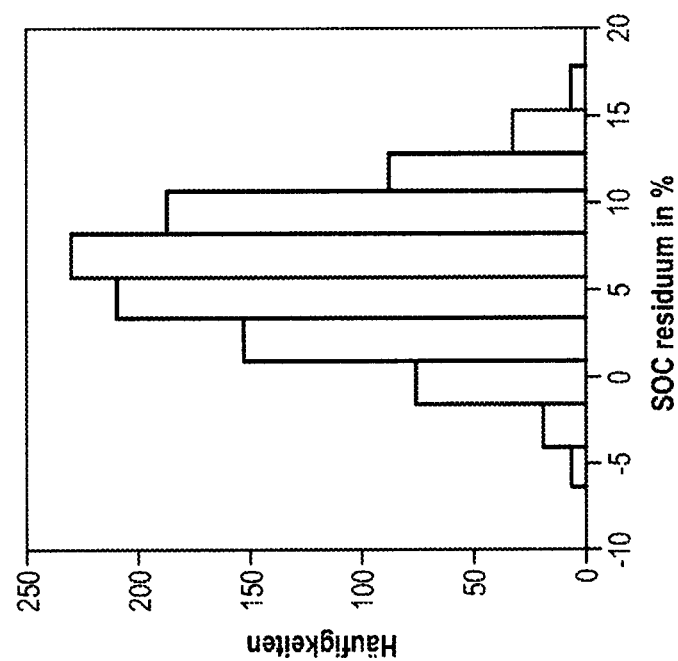
Figure 7A:
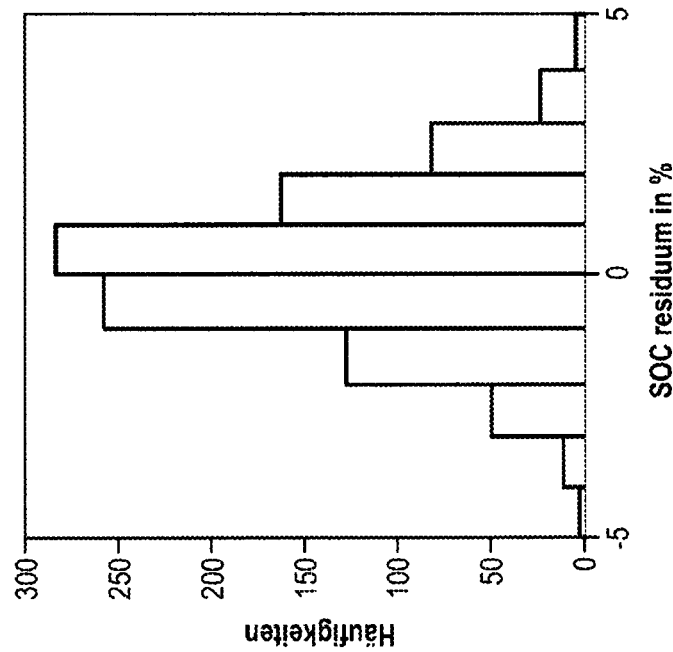

Since all of the past operating variables F and correction variables K are transmitted in the form of residues to the central unit 2, the model that best explains the observations, and therefore minimizes the residues, can now be ascertained through optimization of the model parameters of the reference state-of-charge model 52. The minimization of the residues is done through adapting the model parameters so that, as is shown in FIG. 7b, the residues are on average minimized.

It can be seen that the model optimization can have the result that the expected value of the past observation errors (residues) approaches the value 0. This means that a systematic model error is minimized or even eliminated a posteriori. The uncertainty of the observations is furthermore minimized, since the spread, i.e. the standard deviation, of a histogram prepared for the distribution of the residues is minimized. The model parameters of the reference state-of-charge model 52 can thereby be fitted, subsequently or continuously, during ongoing operation of the vehicle fleet 3.

The dynamic adaptation of the model parameters of the reference state-of-charge model 52 can be carried out with reference to data-based models such as, for example, Gaussian processes or ARIMA models, in order to be able to represent linear trends and periodicity in the model parameters.

After an (a posteriori) parameterization of the reference aging state model 52 for the vehicle fleet 3 (with the aim of minimizing the residue), in addition to trends in model parameters, certain seasonal dependencies also result; for example, the reference aging state model 52 is, in general, temperature-dependent. Both the trends in model parameters as well as the seasonal dependency (i.e. depending on the time of day or the date) of the reference aging state on the temperature can be recognized by taking fleet data and data-based models into consideration, and "learnt out". For this purpose, for example, an ARIMA (autoregressive integrated moving average) model can be trained on the basis of historical data (and, for example, tested against other historical data), so that using big data, for example the temperature-dependency of the aging state is learnt via a data-based correction model, with the aim of achieving the best possible solution to the optimization problem of the residue minimization. The modelling of the reference aging state can thus be made more and more accurately from the past through swarm intelligence of the vehicle fleet.

Due to the previously-described correction of the reference state-of-charge model 52 that has been carried out, even in the case of a state-of-charge model in the motor vehicle that is initially only inaccurately specified in the presence of an accurate or continuously improving reference state-of-charge model in the central unit 2 thus can lead to more precise state-of-charge ascertainments in the vehicle, without a fresh parameterization of the battery model parameters for the state-of-charge model 53 being necessary.

The calculated state of charge $SOC_{calc}$ of the battery can be stored internally at the vehicle in a non-volatile memory, so that this can be used for initialization of the method described in the case of the battery system being restarted. An up-to-date and highly accurate value of the state of charge thereby is not lost, and is again available if the method is restarted. This increases the accuracy of the state-of-charge determination in the vehicle.

The invention claimed is:

1. A method for operating a system for ascertaining a state of charge of a battery of a motor vehicle, comprising:
providing operating variables of the battery;
providing a calculated state of charge in the motor vehicle using a state-of-charge model that indicates the calculated state of charge depending on at least one battery model parameter of the state-of-charge model for the battery;
ascertaining a reference state of charge using a reference state-of-charge model based on the operating variables; and
performing a correction of the at least one battery model parameter depending on a difference between the ascertained reference state of charge and the calculated state of charge in order to adapt the calculated state of charge to the reference state of charge.

2. The method according to claim 1, wherein:
the at least one battery model parameter comprises a series resistor of an equivalent battery circuit of the battery, and
only the series resistor is corrected.

3. The method according to claim 2, wherein performing the correction includes correcting a characteristic curve that represents the series resistor against the state of charge depending on the difference between the calculated state of charge and the reference state of charge.

4. The method according to claim 1, wherein:
performing the correction includes ascertaining multiple differences between the ascertained reference state of charge and the calculated state of charge,
the reference state-of-charge model is implemented externally to the motor vehicle in a central unit, and
the operating variables of the battery are transmitted from the motor vehicle to the central unit.

5. The method as claimed in claim 4, wherein the reference state-of-charge is prepared based on fleet data from a plurality of motor vehicles including the motor vehicle.

6. The method according to claim 4, wherein:
a precision of the reference state-of-charge model is successively improved in that the corrections of the at least one battery model parameter are transmitted to the central unit and recorded, and
systematic deviations of the reference state-of-charge model are corrected based on corrections of a large number of motor vehicles including the motor vehicle.

7. The method according to claim 1, wherein:
the reference state of charge is transmitted to the motor vehicle, or
a trigger signal that is ascertained depending on a result of the comparison between the ascertained reference state of charge and the calculated state of charge is transmitted to the motor vehicle.

8. The method according to claim 1, wherein:
the correction is carried out based on the calculated state of charge that is ascertained with the operating variables during a static operation of the battery, and
the static operation corresponds to an operation of the battery at a constant battery current during a predefined minimum period of time.

9. The method according to claim 1, further comprising:
ascertaining an aging state using an aging state model in a central unit;
providing the ascertained aging state depending on curves of the operating variables; and
taking into consideration the ascertained aging state in the reference state-of-charge model for ascertaining the reference state of charge.

10. The method according to claim 1, further comprising:
receiving the operating variables of the battery with a central unit; and
transmitting the reference state of charge to the motor vehicle or transmitting a trigger signal that is ascertained depending on a result of the comparison between the reference state of charge and a calculated state of charge received from the motor vehicle to the motor vehicle.

11. The method as claimed in claim 1, wherein a computer program product comprises commands which, when the computer program product is executed by a computer, causes the computer to carry out the method.

12. The method as claimed in claim 11, wherein the computer program product is stored on a non-transitory machine-readable storage medium.

13. A system for ascertaining a state of charge of a battery of a motor vehicle, the system comprising:
a plurality of motor vehicles; and
a central unit configured to:
receive operating variables of a battery of a corresponding motor vehicle of the plurality of motor vehicles;
receive a calculated state of charge from the corresponding motor vehicle calculated using a state-of-charge model that indicates the calculated state of charge depending on at least one battery model parameter of the state-of-charge model for the battery;
ascertain a reference state of charge using a reference state-of-charge model depending on the received operating variables, and
perform a correction of the at least one battery model parameter depending on a difference between the reference state of charge and the calculated state of charge in order to adapt the calculated state of charge to the reference state of charge.

14. A device for providing a reference state of charge for a battery of an electrically drivable motor vehicle, the device comprising:
a data processing unit in a central unit configured to:
receive operating variables of the battery;
ascertain a reference state of charge of the battery with a reference state-of-charge model based on the received operating variables of the battery; and
transmit the reference state of charge to the motor vehicle or transmit a trigger signal that is ascertained depending on a result of the comparison between the reference state of charge and a calculated state of charge received from the motor vehicle to the motor vehicle.

15. The device as claimed in claim 14, wherein the motor vehicle is a pedelec, an aircraft, and/or a drone.

* * * * *